United States Patent Office 3,491,188
Patented Jan. 20, 1970

3,491,188
PHARMACEUTICAL COMPOSITIONS AND METHODS FOR THE TREATMENT OF PAIN WITH COMBINATIONS OF THIORIDAZINE AND IMIPRAMINE, DESIPRAMINE OR PHARMACEUTICALLY ACCEPTABLE ACID ADDITION SALTS THEREOF
Willy G. Stoll, Bottmingen, Basel-Land, Switzerland, assignor to Geigy Chemical Corporation, Ardsley, N.Y., a corporation of New York, and Sandoz A.G. Lichtstrasse, Basel, Switzerland
No Drawing. Continuation-in-part of application Ser. No. 594,673, Nov. 16, 1966. This application Oct. 2, 1967, Ser. No. 671,964
Int. Cl. A61k 27/00
U.S. Cl. 424—244
7 Claims

ABSTRACT OF THE DISCLOSURE

Compositions containing (a) thioridazine or a pharmaceutically-acceptable acid addition salt thereof, and (b) imipramine, desipramine, or a pharmaceutically-acceptable acid addition salt thereof, which exhibit valuable pharmacological properties. Methods for the treatment of mental disorders as well as for the treatment of pain of various origin use these compositions.

CROSS REFERENCE TO RELATED APPLICATION

This application is a continuation-in-part of application Ser. No. 594,673, filed Nov. 16, 1969 now abandoned.

DETAILED DISCLOSURE

This invention relates to compositions suitable for administration to patients suffering from mental disorders, especially psychotic illnesses and psychosomatic disturbances. More particularly, it is concerned with compositions comprising (a) thioridazine, (b) imipramine or desipramine and their salts.

It is a matter of common knowledge that the development of psychotropic agents during the last decade has permitted the return to normal pursuits of patients suffering from mental disorders who otherwise would have required prolonged or repeated hospitalisation. Many of these patients. after initial recovery or discharge from the hospital, require maintenance drug therapy if relapse is to be avoided. The symptom complex of psychotic illnesses and psychosomatic disturbances often encompasses a mixture of anxiety-tension and depressive symptoms. In recent years it has become apparent that the symptomatology of such disorders is not sharply defined and symptoms of anxiety-tension and depression can be intermixed with agitation, melancholia, apathy, and psychosomatic symptoms including psychophysiologic reactions and painful bodily states. Such varied symptomatology can be found in agitated depression and depressed schizophrenia as well as in other diagnostic categories. For the amelioration of this complex symptomatology psychotropic agents are desirable which are active in a wide range of mental disorders and are effective against divergent symptoms. In addition it is desirable that such substances are rapidly effective in order to afford prompt relief of all apparent symptoms as well as hidden or subclinical symptoms which might arise when the presenting symptom is successfully remedied.

According to the present invention, there is now provided a pharmaceutical composition affording therapeutic benefit in divergent types of symptomatology, which comprises (a) thioridazine or a pharmaceutically-acceptable acid addition salt thereof and (b) imipramine, desipramine or a pharmaceutically-acceptable salt thereof. Also contemplated are the said compositions in dosage unit form including (c) a pharmaceutically-acceptable carrier or diluent.

The imipramine, desipramine or salt thereof are preferably present in the composition of the invention in a proportion in the range of from about 0.1 to 10 parts by weight per part by weight of the thioridazine or salt thereof.

Pharmacokinetic experiments indicate that the inventive combination has the following advantageous properties over its individual components:

(a) Faster absorption;
(b) The concentration achieved in the target organs is about twice as high;
(c) Maximum concentration is attained in a shorter time.

Pharmacodynamic experiments indicate that the combination shows the following unexpected different effects, when compared with the individual components:

A complementary effect on some central vegetative functions (inhibition of the physostigmine toxicity, inhibition of tremorin tremors and a shortening of the physostigmine arousal in the EEG);

A strong synergism of the analgesic effect;

An antagonism towards the sedative and a strong antagonism towards the neuroleptic effects of thioridazine (narcosis potentiation, inhibition of the amphetamine stimulation, inhibition of the motor activity, atactic action, inhibition of conditioned reactions, and cataleptic effect), and towards the effects of imipramine on some functions of the peripheral vegetative nervous system (adrenaline and noradrenaline effects, and mydriatic action);

The adverse circulatory effects which either of the components have, are neutralised by one another.

On the other hand, some effects of imipramine on the central nervous system remain unchanged (prolongation of the hyperthermic action of amphetamine, inhibition of the cataleptic effects caused by administration of perphenazine and tetrabenazine) and antagonism towards the effect of tetrabenazine on the locomotor activity which, in view of the cataleptic action of thioridazine, is most surprising.

As therefore, many of the effects of imipramine on the central nervous system which are characteristic of antidepressants remain unchanged in this new combination, and undesirable effects of the single components, i.e. some effects on the peripheral vegetative nervous system, the strong sedative, neuroleptic and circulatory effects. are on the other hand strongly reduced or even eliminated altogether, this new combination represents a valuable antidepressant which is superior to the single components not only qualitatively (more specific action coupled with a quicker absorption) but also quantitatively (a stronger effect at the same toxicity which means that the composition has an improved therapeutic index) and can be used for the treatment of psychotic illnesses, particularly depressions, and also psychosomatic disturbances. The weak sedative action renders the combination especially useful for the treatment of agitated depression. Substances exhibiting such action are particularly suitable for ambulatory patients.

The strong analgesic action of the combination makes it, moreover effective in the treatment of pain syndroms both of an organic and functional nature. In addition the depressive features which are often secondary to painful states also respond to therapy using the inventive combination.

Important further embodiments of the instant invention are methods of treatment, particularly a method for the treatment of psychotic illnesses, a method for the treatment of psychosomatic disturbances, as well as a method for the treatment of pain, which methods comprise administering to a patient an effective amount of a pharmaceutical composition of the invention. Especially effective embodiments are in essence methods of treatment, particularly a method for the treatment of psychotic illnesses, a method for the treatment of depression, a method for the treatment of psychosomatic disturbances, as well as a method for the treatment of pain, which methods comprise administering to a patient an effective amount of a composition comprising (a) thioridazine or a pharmaceutically-acceptable acid addition salt thereof and (b) from about 0.1 parts to about 10 parts of imipramine, desipramine or a pharmaceutically-acceptable acid addition salt thereof per part by weight of said thioridazine or salt thereof.

Especially valuable embodiments of the instant invention comprise compositions and administration of thioridazine in admixture with desipramine or imipramine in the form of their acid addition salts with pamoic acid. Additional advantages in these embodiments reside in a notably high oral effectiveness combined with an extremely low toxicity. Furthermore, use of the compositions of these embodiments is not accompanied by any unpleasant taste. Accordingly, the embodiments containing the pamoates are admirably suited for oral pharmaceutical preparations which are effective for long intervals, and which are not suitable for abusive use, especially by outpatients.

The compound thioridazine, also known as 3-methylthio-N-[2'-(N'-methyl-2-piperidyl)ethyl]phenothiazine, is a drug well known for its ability to assist in the clinical control of mental disease and it can readily be prepared by techniques familiar to those skilled in the art of preparing organic compounds. The compounds imipramine, desipramine and their salts are well known drugs indicated for long term control of depressive states. Imipramine, also known as 5-(3-dimethylamino-propyl) - 10,11 - dihydro-5H-dibenz[b,f]azepine and desipramine, also known as 5-(3-methylamino-propyl)-10,11-dihydro - 5H - dibenz[b,f]azepine, are readily prepared by procedures familiar to those skilled in the art. Pamoic acid, also known as embonic acid and as 2,2' - dihydroxy - 1,1' - dinaphthylmethane-3,3'-dicarboxylic acid, is a freely available item of commerce.

The terms "psychotic illnesses" and "psychosomatic disturbances" refer broadly to diseases causing symptoms to be presented by patients with moderate to severe anxiety and/or agitation and depressed mood; patients with depression in whom anxiety and/or agitation are severe; and patients with depression and anxiety in association with chronic physical disease. The term "schizophrenia" broadly contemplates both acute and chronic diseases or other pathological conditions of humans, characterized by loss of contact with environment and by disintegration of personality and which are commonly alleviated by treatment with psychotropic agents, especially major tranquilizers. Illustrative conditions alleviated through practice of the instant invention include: severe anxiety, depression, fatigue, inertia, and the like. The term "pharmaceutically-acceptable acid addition salts" when used herein and in the appended claims in association with thioridazine, imipramine and desipramine contemplates those derived from the free bases and organic and inorganic acids. Illustrative of the acids, in addition to pamoic acid, which form pharmaceutically-acceptable addition salt with thioridazine, imipramine and desipramine are, for example: hydrochloric, hydrobromic, sulfuric, phosphoric, methane-sulfonic, acetic, lactic, succinic, malic, aconitic, phthalic, tartaric, and the like.

The instant compositions are well tolerated by the patient. Their use is accompanied by a quick onset of action and a long lasting effect. This makes them useful against a broad spectrum of diseases, including, in addition to those mentioned above, schizophrenia with associated depressive symptoms, and psychotic reactions in patients, with organic brain damage and mental deficiency, as well as for the efficient treatment of pain of various origin.

The daily dosages for the compositions of the invention vary between about 20 and 600, and preferably 60 to 450 mg. for adult individuals. Of this daily dosage, the amount of imipramine, desipramine or its salts is preferably of the order of from about 0.1 part to about 10 parts by weight for each part by weight of thioridazine or its salts. Suitable dosage units such as tablets, press-coated tablets or capsules contain from about 2.5 to about 125 mg. and preferably from about 4.0 to about 100 mg. of thioridazine or its salts and from about 0.25 to about 50 mg. of imipramine, desipramine or their salts. Especially preferred unit dosage forms for administration to humans are oral tablets or gelatine capsules containing 100, 10 and 50 mg. of thioridazine hydrochloride and 40, 10 and 25 mg. of imipramine hydrochloride or desipramine hydrochloride respectively. Administration of three to four dosage units of these compositions to adult human patients causes excellent response to manifestations associated with psychotic illnesses, particularly depression, and also psychosomatic disturbances, as well as to conditions of pain of various origin. To produce dosage units for peroral application, the compositions of this invention may be combined, for example, with solid pharmaceutrically acceptable pulverulent carriers such as lactose, saccharose, sorbitol, mannitol; starches such as potato starch, corn starch or amylopectin, also laminaria powder, highly dispersed silicic acid or citrus pulp powder; cellulose derivatives or gelatin, also glycerine and lubricants such as magnesium or calcium stearate or polyethylene glycols of suitable molecular weights may be added, to form tablets, press-coated tablets or cores. The latter are coated, for example, with concentrated sugar solutions which can contain, for example, gum arabic, talcum and/or titanium dioxide, or they are coated with a film forming polymer dissolved in easily volatile organic solvents or a mixture of organic solvents. Dyestuffs can be added to these coatings, for example, to distinguish between different contents of active substance.

Hard gelatin capsules contain, for example, powder mixtures or granulates of the instant compositions with solid pulverulent carriers such as, e.g. lactose, saccharose, sorbitol, mannitol, and further starches such as potato starch, corn starch or amylopectin, cellulose derivatives or gelatin, as well as magnesium stearate or steric acid, and talcum.

Such tablets, press-coated tablets, coated tablets and capsules contain preferably between about 10 and about 150 mg. of the instant compositions, said amounts constituting from 10 to 90% and preferably about 40 to 80% of the total weight of the tablets, press-coated tablets, coated tablets and capsules, respectively.

The following examples are given by way of illustrating the compositions and methods of the instant invention. They are not to be construed as limiting the scope thereof in any way.

EXAMPLE 1

Manufacture of tablets 15.0 g. of thioridazine hydrochloride, 25.0 g. of imipramine hydrochloride, 5.0 g. of highly dispersed silicic acid and 89.1 g. of corn starch are well mixed and the mixture is uniformly moistened with a solution of 5.0 g. of gelatin, 2.0 g. of glycerin and 0.9 g. of sodium metabisulphite in 100 ml. of dimineralized water. The resulting mass is granulated through a sieve and dried to a water content of 1.0–2.1% (absolute). The dry granulate is mixed with 8.0 g. of potato starch, 1.0 g. of highly dispersed silicic acid, 8.0 g. of talcum and 1.0 g. of magnesium stearate and the mixture is pressed into 1000 tablets each containing 15 mg. of thioridazine hydrochloride and 25 mg. of imipramine hydrochloride. In the same manner, tablets are prepared containing 15 mg. of thioridazine hydrochloride and 25 mg. of desipramine hydrochloride.

EXAMPLE 2

Manufacture of press-coated tablets (a) For the preparation of the core 5.0 g. of thioridazine hydrochloride, 106.0 g. of dried corn or potato starch, 37.00 g. of lactose and 3.00 g. of highly dispersed silicic acid are well mixed and the mixture is uniformly moistened with a solution of 6.00 g. of gelatin and 4.00 g. of glycerin in approximately 55 ml. of demineralized water. The mass obtained is granulated through a sieve and dried to a water content of 1.9–2.1% (absolute). The dry granulate is mixed with 10.00 g. of dried potato starch, 8.00 g. of talcum and 1.00 g. of magnesium stearate and the mixture is pressed into 1000 tablets cores each weighing 180 mg.

(b) A second granulate is prepared by uniformly mixing 25.0 g. of desipramine hydrochloride with 502.0 g. of potato starch, and then moistening with a solution of 15.0 g. of gelatin and 10.0 g. of glycerin in approximately 100 ml. of demineralized water. This is followed by granulating and drying. This granulate is mixed with 20.0 g. of talcum, 20.0 g. of potato starch, 5.0 g. of highly dispersed silicic acid and 3.0 g. of magnesium stearate. The tablet cores produced according to (a) are coated in special tablet machines with the mixture obtained. In this way 1000 press-coated tablets each weighing 780 mg. and each containing 5 mg. of thiordiazine hydrochloride and 25 mg. of desipramine hydrochloride are produced. In a similar manner press-coated tablets are prepared containing 5 mg. of thioridazine hydrochloride and 25 mg. of imipramine hydrochloride.

EXAMPLE 3

The procedures of Examples 1 and 2 are used, substituting appropriate quantities of ingredients to prepare tablets containing (a) thioridazine hydrochloride and, respectively, (b) 2.5 and 10 parts of desipramine hydrochloride per part by weight of said thioridazine hydrochloride and (a) thioridazine hydrochloride and, (b) 2.5 and 10 parts of imipramine hydrochloride per part by weight of said thioridazine hydrochloride. These compositions are useful in the treatment of psychotic illnesses, particularly depression and also psychosomatic disturbances, as well as conditions of pain of various origin.

EXAMPLE 4

Manufacture of capsules

| Ingredient: | Quantity/capsule, mg. |
| --- | --- |
| Thioridazine hydrochloride | 4 |
| Imipramine hydrochloride | 25 |
| Corn starch, U.S.P. | 271 |

The above ingredients are mixed and introduced into a two-piece hard gelatin No. 1 capsule. One such capsule is administered from two to four times daily to patients suffering from psychotic illnesses, particularly depression, psychosomatic disturbances and also from pain of various origin.

EXAMPLE 5

Manufacture of capsules

| Ingredient: | Quantity/capsule, mg. |
| --- | --- |
| Thioridazine hydrochloride | 5 |
| Imipramine pamoate | 45 |
| Corn starch | 100 |
| Lactose | 38 |
| Silica gel | 12 |

The above ingredients are thoroughly mixed and introduced into a No. 4 opaque capsule. From one to five such capsules may be administered daily to treat psychotic illnesses, particularly depression, pyschosomatic disturbances and also pain, depending on the nature and degree of the specific condition. In a similar manner capsules are prepared containing 5 mg. of thioridazine hydrochloride and 45 mg. of desipramine pamoate.

EXAMPLE 6

Manufacture of hard gelatine capsules 100 g. of thioridazine hydrochloride are intimately mixed with 40 g. imipramine hydrochloride and 135 g. of corn starch. The mixture is then moistened with 65 ml. of a solution consisting of equal parts of demineralized water and ethanol. The moist mixture is granulated and dried. 10 g. of corn starch and 15 g. of talcum are then admixed and 1000 hard gelatine capsules are being filled each with 300 mg. of this final granulate. Each capsule thus contains 100 mg. thioridazine hydrochloride and 40 mg. imipramine hydrochloride.

EXAMPLE 7

Manufacture of hard gelatine capsules 10 g. thioridazine hydrochloride are intimately mixed with 10 gr. imipramine hydrochloride and 255 g. of corn starch. The mixture is then moistened with 65 ml. of a solution consisting of equal parts of demineralized water and ethanol. The moist mixture is granulated and dried. 10 g. of corn starch and 15 g. of talcum are then admixed and 1000 hard gelatine capsules are being filled each with 300 mg. of this final granulate. Each capsule thus contains 10 mg. thioridazine hydrochloride and 10 mg. imipramine hydrochloride.

EXAMPLE 8

Manufacture of hard gelatine capsules 50 g. thioridazine hydrochloride are intimately mixed with 25 gr. imipramine hydrochloride and 200 g. of corn starch. The mixture is then moistened with 65 ml. of a solution consisting of equal parts of demineralized water and ethanol. The moist mixture is granulated and dried. 10 g. of corn starch and 15 g. of talcum are then admixed and 1000 hard gelatine capsules are being filled each with 300 mg. of this final granulate. Each capsule thus contains 50 mg. thioridazine hydrochloride and 25 mg. imipramine hydrochloride.

If in Examples 6–8 the imipramine hydrochloride is replaced by equal parts of desipramine hydrochloride, then hard gelatine capsules are obtained which contain 100 mg. thioridazine hydrochloride and 40 mg. desipramine hydrochloride, 10 mg. thioridazine hydrochloride and 10 mg. desipramine hydrochloride, and 50 mg. thioridazine hydrochloride and 25 mg. desipramine hydrochloride respectively.

What is claimed is:

1. A pharmaceutical composition for oral administration comprising (a) thioridazine or a pharmaceutically-acceptable acid addition salt thereof and (b) from about 0.1 to about 10 parts by weight of imipramine, desipramine or a pharmaceutically-acceptable acid addition salt of either per part by weight of said thioridazine or a pharmaceutically-acceptable acid addition salt thereof.

2. A composition as defined in claim 1 in dosage unit form including (c) a pharmaceutically-acceptable carrier.

3. A composition as defined in claim 1 wherein said thioridazine, imipramine or desipramine is present in the form of an acid addition salt with pamoic or hydrochloric acid.

4. A pharmaceutical composition for oral administration comprising (a) 1 part by weight of thioridazine or a pharmaceutically-acceptable acid addition salt thereof and (b) 0.5 or 1 part by weight of imipramine or a pharmaceutically-acceptable acid addition salt thereof.

5. A composition as defined in claim 4 wherein said thioridazine or imipramine is present in the form of an addition salt with pamoic or hydrochloric acid.

6. A method which comprises orally administering to a patient suffering from pain an effective amount of a composition comprising (a) thioridazine or a pharmaceutically-acceptable acid addition salt thereof and (b) from about 0.1 to about 10 parts by weight of imipramine, desipramine or a pharmaceutically-acceptable acid addition salt of either per part by weight of said thioridazine or a pharmaceutically-acceptable acid addition salt thereof.

7. A method as defined in claim 6 wherein said thioridazine, imipramine or desipramine is present in the form of an addition salt with pamoic or hydrochloric acid.

References Cited

Amer. Jour. of Psychiatry (I), 121, No. 5, pp. 496–497 (1964), Amer. Jour. of Psychiatry (II), 117, No. 11 pp. 997–1003 (1961).

Benson and Schiele, Tranquilizing and Antidepressant Drugs. (1962), p. 16.

ALBERT T. MEYERS, Primary Examiner

S. J. FRIEDMAN, Assistant Examiner

U.S. Cl. X.R.

424—247